United States Patent
Liu et al.

(10) Patent No.: US 7,255,239 B2
(45) Date of Patent: Aug. 14, 2007

(54) COLLAPSIBLE AND REUSABLE CONTAINER AND METHOD FOR USE

(76) Inventors: Xuewu Liu, 865 W. Huntington Dr. #19, Arcadia, CA (US) 91007; Tian Xiao Liu, 865 W. Huntington Dr. #19, Arcadia, CA (US) 91007; Xue Wen Liu, 865 W. Huntington Dr. #19, Arcadia, CA (US) 91007

( * ) Notice: Subject to any disclaimer, the term of this patent is extended or adjusted under 35 U.S.C. 154(b) by 305 days.

(21) Appl. No.: 10/926,429

(22) Filed: Aug. 25, 2004

(65) Prior Publication Data

US 2006/0054620 A1 Mar. 16, 2006

(51) Int. Cl.
*B65D 6/00* (2006.01)
*B65D 8/14* (2006.01)
*B65D 21/02* (2006.01)

(52) U.S. Cl. .............................. 220/6; 220/7; 220/23.4
(58) Field of Classification Search .................... 220/6, 220/7
See application file for complete search history.

(56) References Cited

U.S. PATENT DOCUMENTS

| | | | | |
|---|---|---|---|---|
| 3,130,850 A | * | 4/1964 | Mynatt et al. | 220/6 |
| 3,527,339 A | * | 9/1970 | Cipolla | 206/290 |
| 4,120,417 A | * | 10/1978 | Aquino | 220/6 |
| 5,125,524 A | * | 6/1992 | Hosoda et al. | 220/7 |

* cited by examiner

Primary Examiner—Anthony D. Stashick
Assistant Examiner—Shawn M. Braden
(74) Attorney, Agent, or Firm—Law Offices of Bin Li & Associates; Let Z. Kwan, Esq.

(57) ABSTRACT

A collapsible and reusable shipping or storage container that easily collapses to a flat stackable package with no small or loose parts. Said container can be locked with a single locking mechanism in collapsed folded position or in fully open position with items inside. Said container is collapsed for return transport to distribution center to await reloading of future contents and thereby minimizes required space and preventing waste while in transport returning to distribution facility. To fold and collapse said container, top lid slides out and is lifted diagonally and removed from container, bottom panel is released and flipped up toward front side panel, collapsible sides are folded in and removed lid is placed into designated slot within collapsed container.

15 Claims, 17 Drawing Sheets

COLLAPSIBLE AND REUSABLE CONTAINER AND METHOD FOR USE

BACKGROUND OF THE INVENTION

1. Field of the Invention

The present invention relates to the field of containers and specifically to a collapsible and reusable container and a method for use.

2. Brief Description of the Related Art

Products, articles of manufacture or commerce are transported between locations and usually in containers. These containers are usually made of paper, cardboard, wood or other materials. These materials are made from trees and other natural resources that are rapidly decreasing. After these materials and articles have reached the end of their destination, the containers that housed such materials as they are disposable, are usually thrown away and result in landfills. Other containers that are recyclable and not thrown away require sorting and shipping to other facilities in the recycling process, which contribute to pollution during chemical treatment processes.

Other shipping containers are composed of reusable materials such as plastic and are usually reused several times before they are disposed of However, before these plastic containers can be reused, they require shipping back to their origination location. Since these plastic containers occupy the same volume of space whether they are full or empty, shipping these plastic containers back to their original location means that the same amount of space in the shipping vehicle is required to ship them back as is required to ship them to the destination location. This necessitates that such vehicles be dedicated to ship such plastic containers back to their original location for their reuse. This also becomes a waste of resources. By way of example, a large chain such as Burger King having over 8,700 branches in the United States must transport produce or vegetable products across the country and as each product is transported, trash is produced by the shipping boxes that are currently being used. Additionally, factories must make an additional box to replace every box that is thrown away.

The present invention relates to a collapsible and reusable container that solves both of the above mentioned problems. The present invention is a collapsible and reusable container that can be reused repeatedly and can be made from a variety of different materials. After the products or raw materials are shipped to their destinations in the collapsible and reusable container of the present invention, the collapsible and reusable container can be collapsed down to a flat, compact package occupying minimal volume with no small or loose parts that can be lost during shipping. This collapsed flat package can be easily stacked and shipped back to its original location occupying minimum space on the shipping vehicles when collapsed. This results in extra space that is conserved and can be used for more productive purposes, such as to ship other products either back to their original location or to new locations. Current commercial systems are utilized world wide. These are a closed system, used by chain stores; a semi-closed system as used by supermarkets; or an open system as used by end users.

The collapsible and reusable container of the present invention is extremely easy to assemble and collapse without the need for tools or special skills or instructions. The collapsible and reusable container of the present invention can be securely locked with a single lock whereby the bottom and top sides can be locked into place thereby locking all sides into place.

The collapsible and reusable container of the present invention may provide an airtight means in which articles such as documents would be protected from environmental elements or alternatively, a means in which the contents would be open to external conditions, in instances of transport of produce.

The collapsible and reusable container of the present invention will be easily accepted in all various industries, including but not limited to, clothing industries, shoe industries, food industries, auto part industries, fruit and vegetable industries, or any other industry requiring shipping of articles from one locale to another.

The collapsible and reusable container of the present invention will be accepted by various users and will become a standard in the shipping industry due to its low cost in manufacturing.

SUMMARY OF THE INVENTION

The present invention is a collapsible and reusable container that easily collapses to a flat, stackable compact package with no small or loose parts. The collapsible and reusable container of the present invention can be securely locked.

The present invention has the advantages over the prior art by having interchangeable parts. These interchangeable parts can be replaced as the parts and hinges of the container wear and necessitate replacement without having the expense of replacing the entire container. Such interchangeable parts of the present invention include the element of hinges and keys acting as pins for which the sides of the invention are rotatably connected. Such hinges fit together by means of pins or keys having a male insertion end fitting into a female receiving end. These pins are removable by means of a locking mechanism or threadlike means.

The present invention is composed of material for purposes of use depending on such uses. Such common uses that are a means of example and not limitation are for common transportation in which documents may be transported from one location to another and in which plastic or a resin of which would be satisfactory material. Another use of the present invention would be the transportation of monies or currencies or other important items of high value in which the connecting keys or pins would be hidden and unexposed whereby forcible entry of the container's contents would be prevented. An additional element capable of providing added protection of the container's contents including such important items would be added weight in the form of the material composing the container itself so that easy asportation would not be achieved by improper parties. The addition of a locking means would provide additional security. Such locking means may be combined by way of example and not limitation, with an alarm, or sounding device or beacon. In instances in which the containers of the present invention wound into improper possession the additional element of a tracking means such as global positional system or GPS would provide for recovery. Such security would provide for, as a way of example and not limitation, the public, public and private businesses, military, etc.

Such locking means would provide locking for the bottom and the top side, whereby all sides would be locked in place and prevented from collapsing. The locking means would eliminate the necessity for tapes or other adhesives thereby preventing further additional waste products. Such locking means could be by way of example and not limitation, a combination in which the end receiver would have access by a combination or a key in which parties of a same company would be able to unlock such locking means.

The bottom portion of the present invention would provide a non-slip means such that it may also serve as a stackable means fitting into companion stackable means on the tops of other similar containers.

The top lid of the present invention is removable and may be hinged outward or removed by lifting diagonally from the top clearing the locking portions that prevent the lid from coming off accidentally. The removed lid may be placed into an accompanying slot between the folded sides of the container and held into place by a locking means. Such locking means, by way of example and not limitation can be a belt that holds the container in its folded position with said lid covering inside each container's designated slot and preventing said lid from loss. Such locking means can also serve as a means to keep said lid on present container in fully open position. Depending on required use, such locking means can be made of different materials for added security as necessary.

The present invention may utilize a grooved side that acts as a carrying handle. The sides of the present invention can be elongated as pieced (3) or (5) can be extended to a length limited by the length of the front and back sides to allow for expansion of the container while retaining compact folded size.

The bottom stacking means of a container stacked on top in relation to the bottom relative container does not rest on the bottom of said top container. Such support is composed of each container's sides acting as supports so as to enable equal weight distribution to be spread throughout the container's sides instead of having support weight on said top container's bottom.

Such containers of the present invention could be used for all types of packaging, small or large. Such containers if made large enough would provide added sturdiness and protection for such articles as televisions or refrigerators and could be returned for a refund.

The present invention may have a covering or pocket means on an outside panel to enable a packing list, or receipt detailing the contents of the container. Presently, the packing list enclosed portion on shipping boxes must be ripped apart and in which time boxes tear resulting in weakening of boxes. By having a permanent pocket on the outside, such materials are saved from having to be remanufactured as the pocket can be reused as the packing list can simply be removed and reinserted with a new packing list.

At the end of the container of the present invention's shipping use, the container can be used for potting, by placing soil into such containers and planting trees, and serve as a means for growing such plants that can be sold to the public. Such additional planting conduits for plants would contribute in the aggregate, to the lessening of overall effect of global warming.

Another example of a possible use of the container of the present invention and not a limitation, after its shipping life ends, is to use the container as a means to serve as a dam or as a water barrier. Containers of the present invention would be filled with rocks or other materials providing weight to prevent flooding of waters after rains and would be more efficient than ordinary sandbags as sandbags are mostly only filled with sand, but the containers of the present invention may be filled with rocks or any other material.

At the end of the container's use as a potting pot or dam, the containers depending on their composition can be burned or incinerated or can be treated with bacteria which would digest such materials.

In accordance with a preferred embodiment of the invention, there is disclosed a collapsible and reusable container comprising: a front, back, left, right, bottom and top, having said top side removable slide-able outwards towards front of said container, and having bottom side swing-able to lie flush with back side allowing for collapsing and folding.

Still other objects, features, and attendant advantages of the present invention will become apparent to those skilled in the art from a reading of the following detailed description of embodiments constructed in accordance therewith, taken in conjunction with the accompanying drawings.

DESCRIPTION OF PREFERRED EMBODIMENTS

Figure 1:
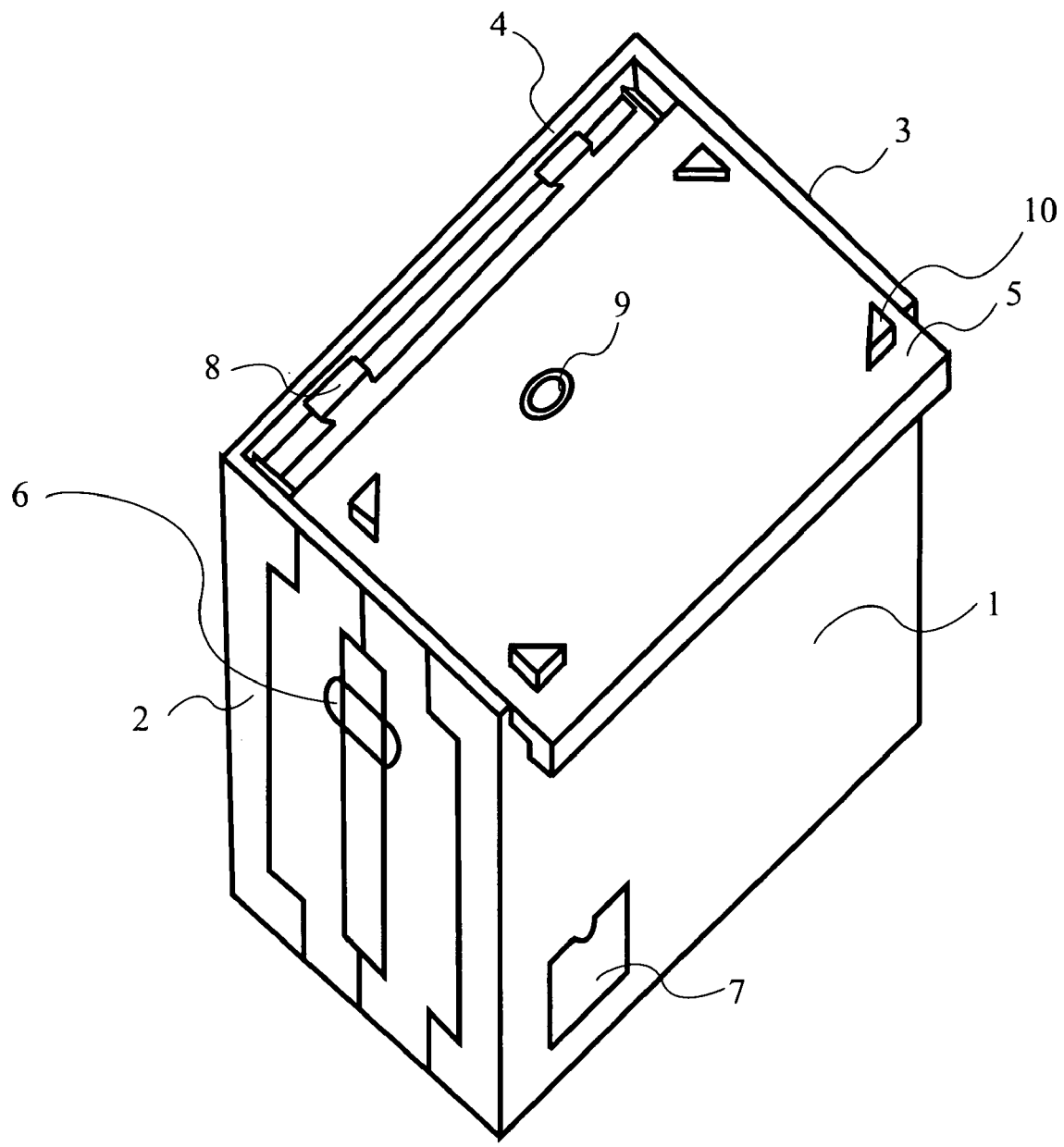
FIG. 1 shows the top front and left side of the collapsible and reusable container.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring to the drawing figures, like reference numerals designate identical or corresponding elements throughout the several figures.

In accordance with a preferred embodiment of the invention, there is disclosed a collapsible and reusable container comprising: a front, back, left, right, bottom and top, having said top side removable slide-able outwards towards front of said container, and having bottom side swing-able to lie flush with back side allowing for collapsing and folding.

The invented collapsible and reusable container of FIG. 1 shows the top (5) front (1) and left side (2) of the collapsible and reusable container. The right side (3) is opposite the left side (2) and back side (4) is opposite front side (1). Removable lid (5) is coupled to stacking aligner (10). Removable lid slides into place accommodated by aligning grooves (8). On front side (1) is a means to display container's contents (7). Carrying means (6) is shown on left side of container. Locking means (9) is coupled to stacking aligner (10) on lid (5).

Figure 2:
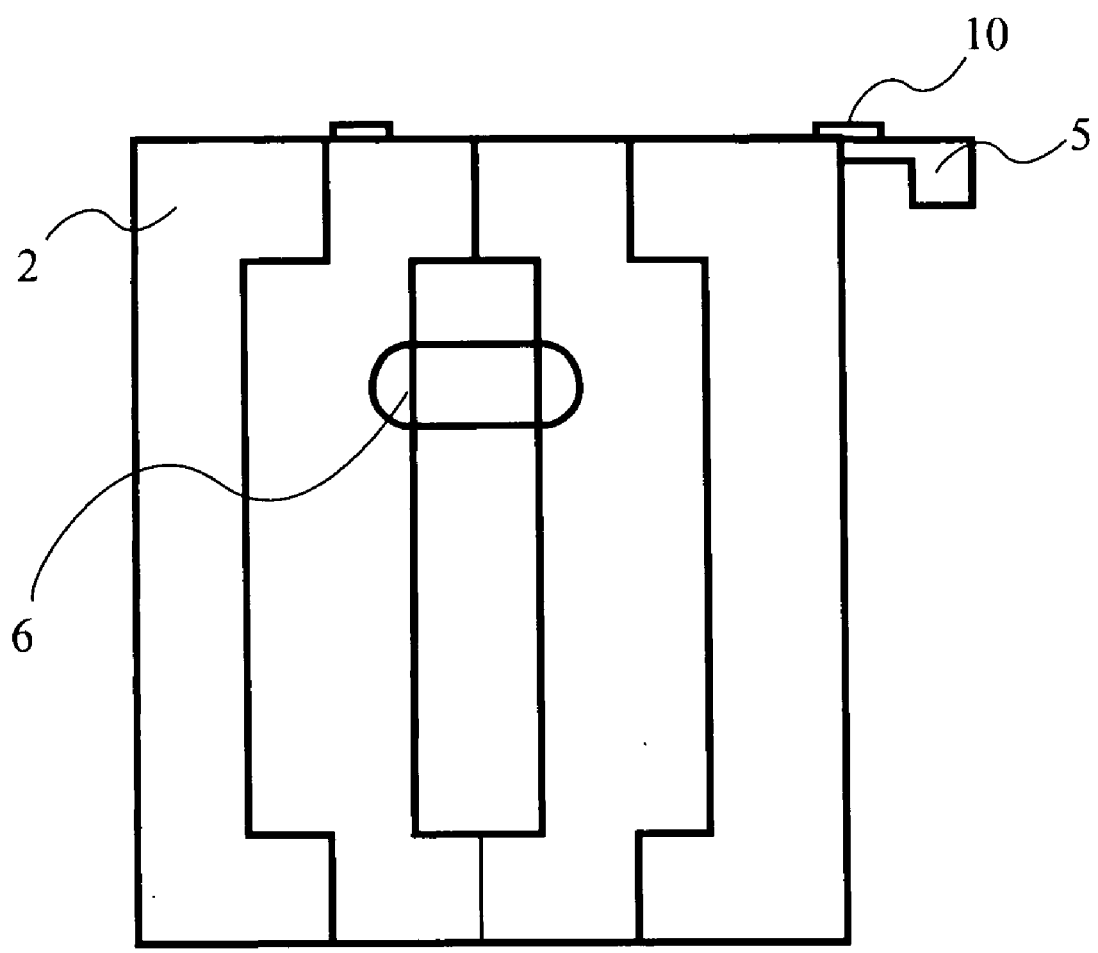
FIG. 2 shows a left side view of the collapsible and reusable container with the lid partially removed.

The left side of the container (2) of FIG. 2 shows a left side view of the collapsible and reusable container with the lid (5). Lid is coupled with stacking aligner (10) and is partially removed. Carrying handle (6) is shown on left side (2) of container.

Figure 3:
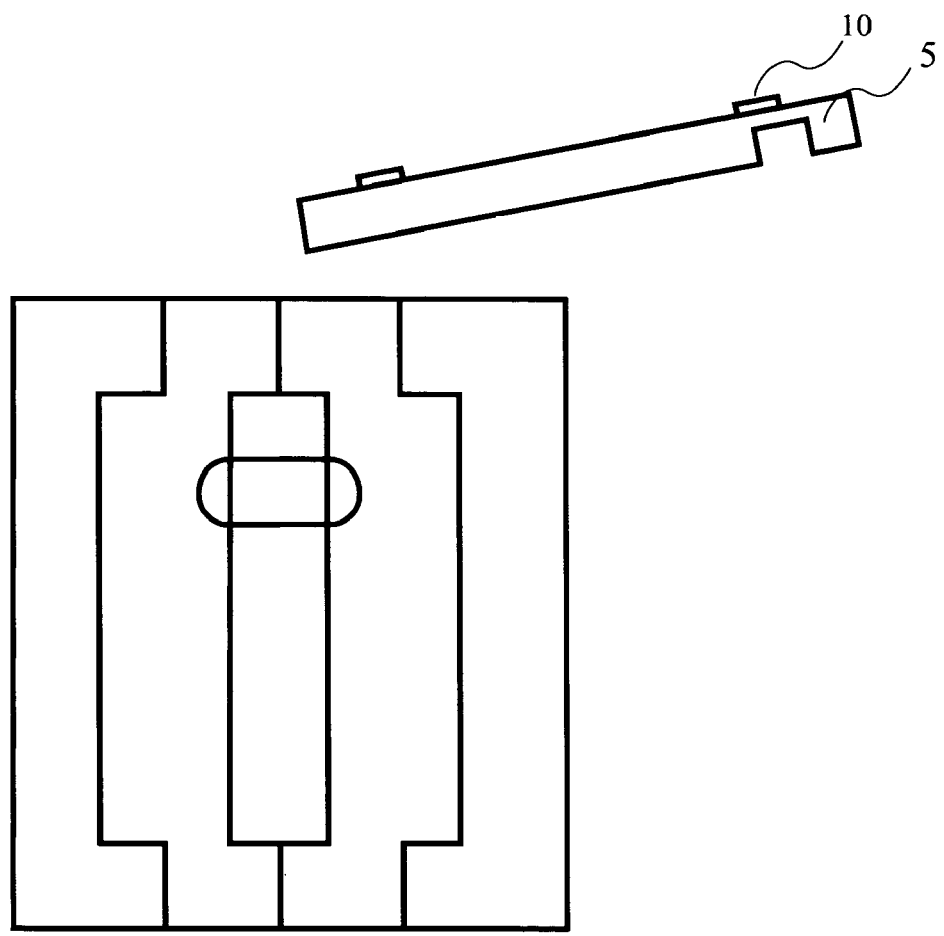
FIG. 3 shows the top lid of collapsible and reusable container removed as seen from left side.

FIG. 3 shows the top lid (5) of collapsible and reusable container removed as seen from left side.

Figure 4:
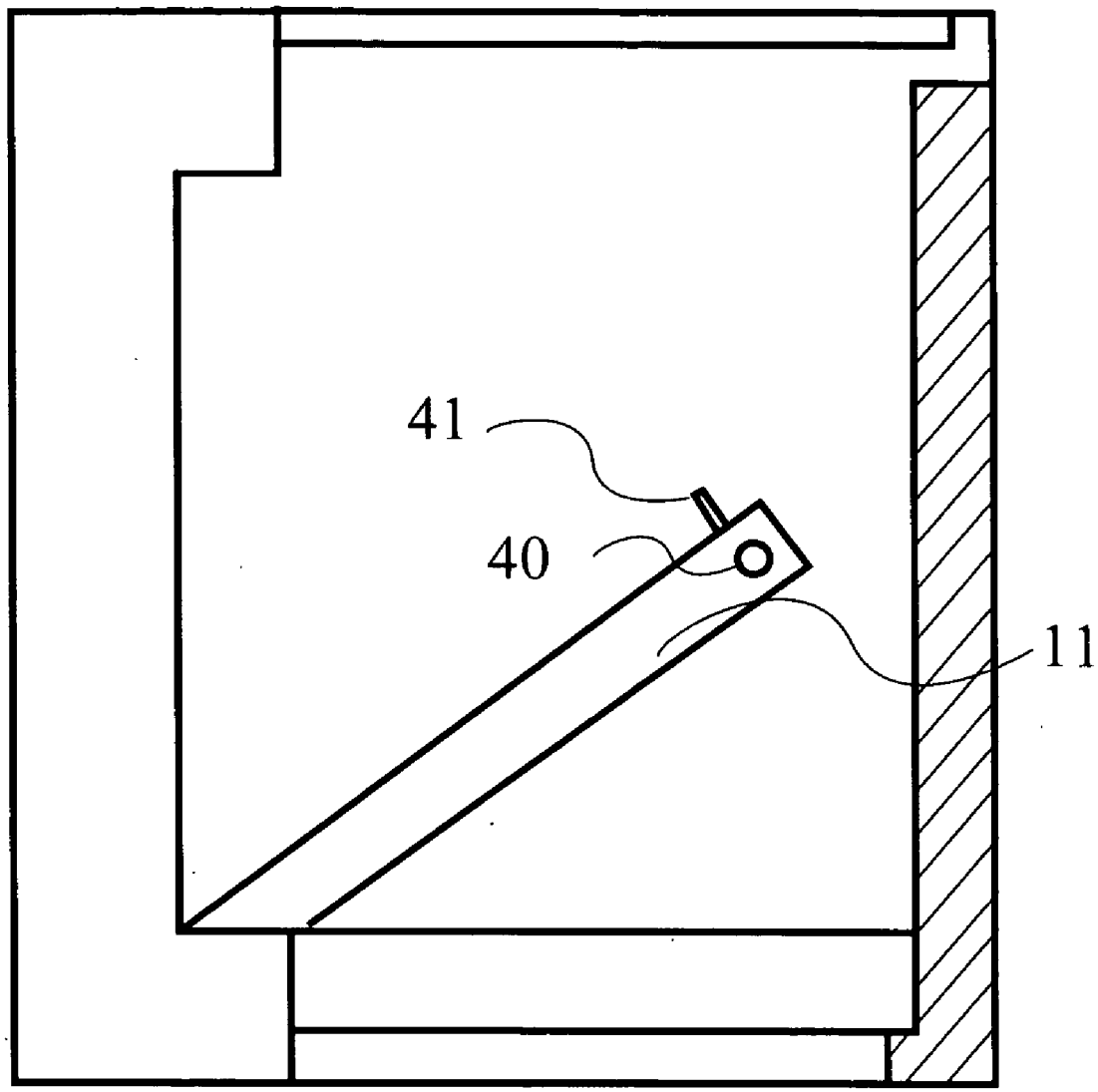
FIG. 4 is a cut-away view of collapsible and reusable container showing bottom panel swinging upwards.

Cut away view of container from right side (3) of FIG. 4 of collapsible and reusable container shows bottom panel (11) swinging upwards. Bottom panel (11) is released from position at bottom by release means (41) releasing locking means (40).

Figure 5:
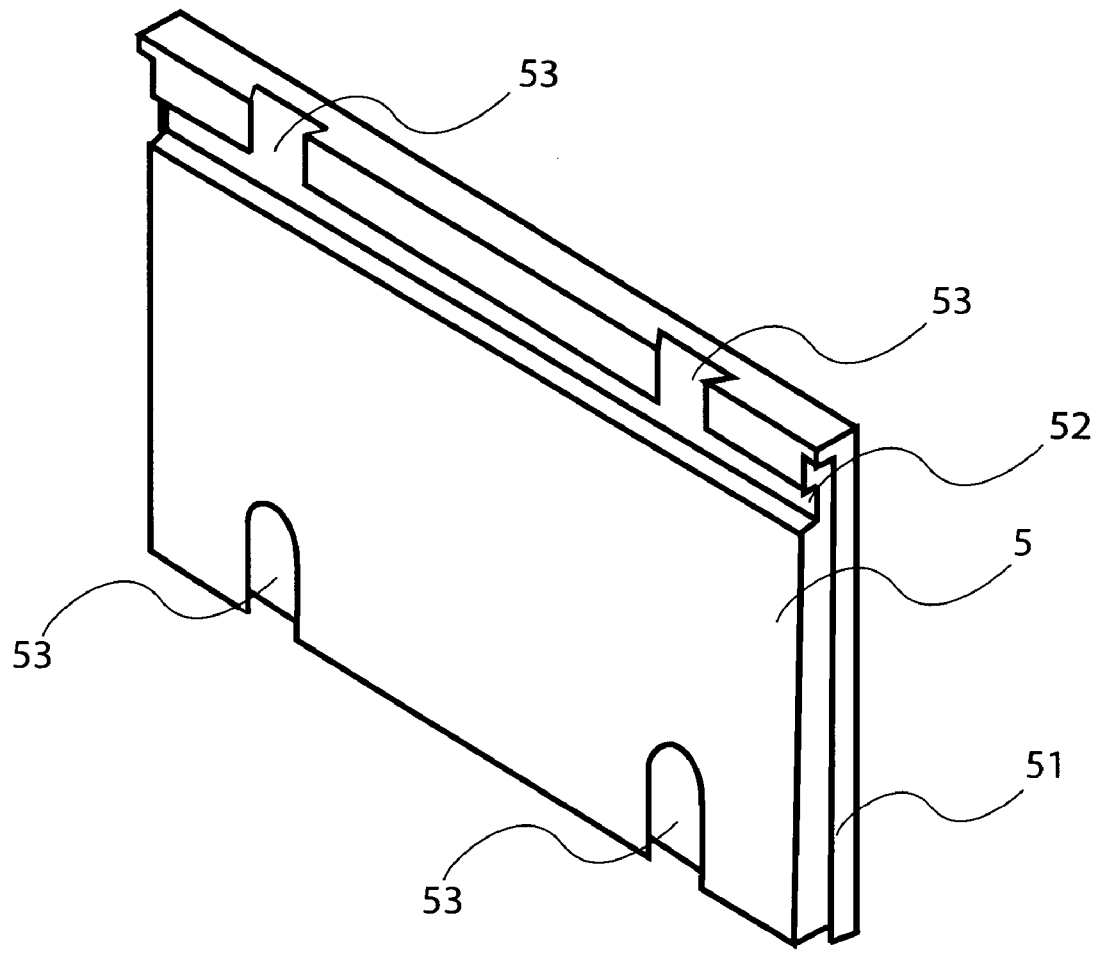
FIG. 5 shows the lid of the collapsible and reusable container of the interior of panel.

Interior panel of lid (5) as in FIG. 5 shows the lid of the collapsible and reusable container of the interior of panel. Lid (5) rests on ledge (51) snugly for added strength and locks onto container and is prevented from sliding off unless lifted diagonally by locking lid groove (52). Aligning groove slots (53) act as female receptacles for aligning grooves (8) of FIG. 1.

Figure 6:
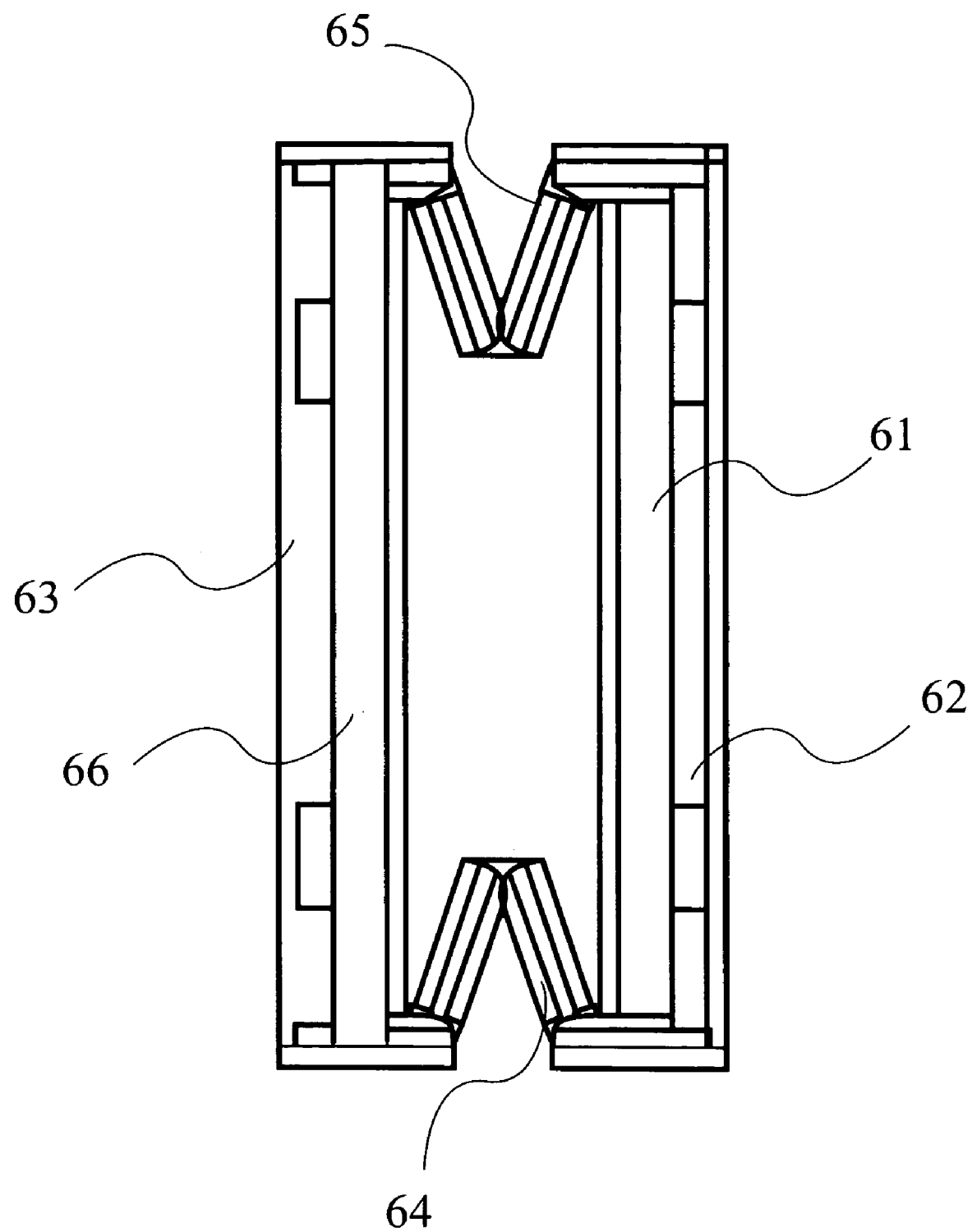
FIG. 6 shows a top view of collapsible and reusable container collapsing inwards.

FIG. 6 shows a top view of collapsible and reusable container collapsing inwards with a top view of bottom panel resting ledge (61) and back panel top lid resting ledge (62) and front panel top lid resting ledge (63). Side hinge panel of right side (64) is folded inward opposite of left side hinge panel (65) folded inward. Bottom panel is swung upward in collapsible position (66).

Figure 7:
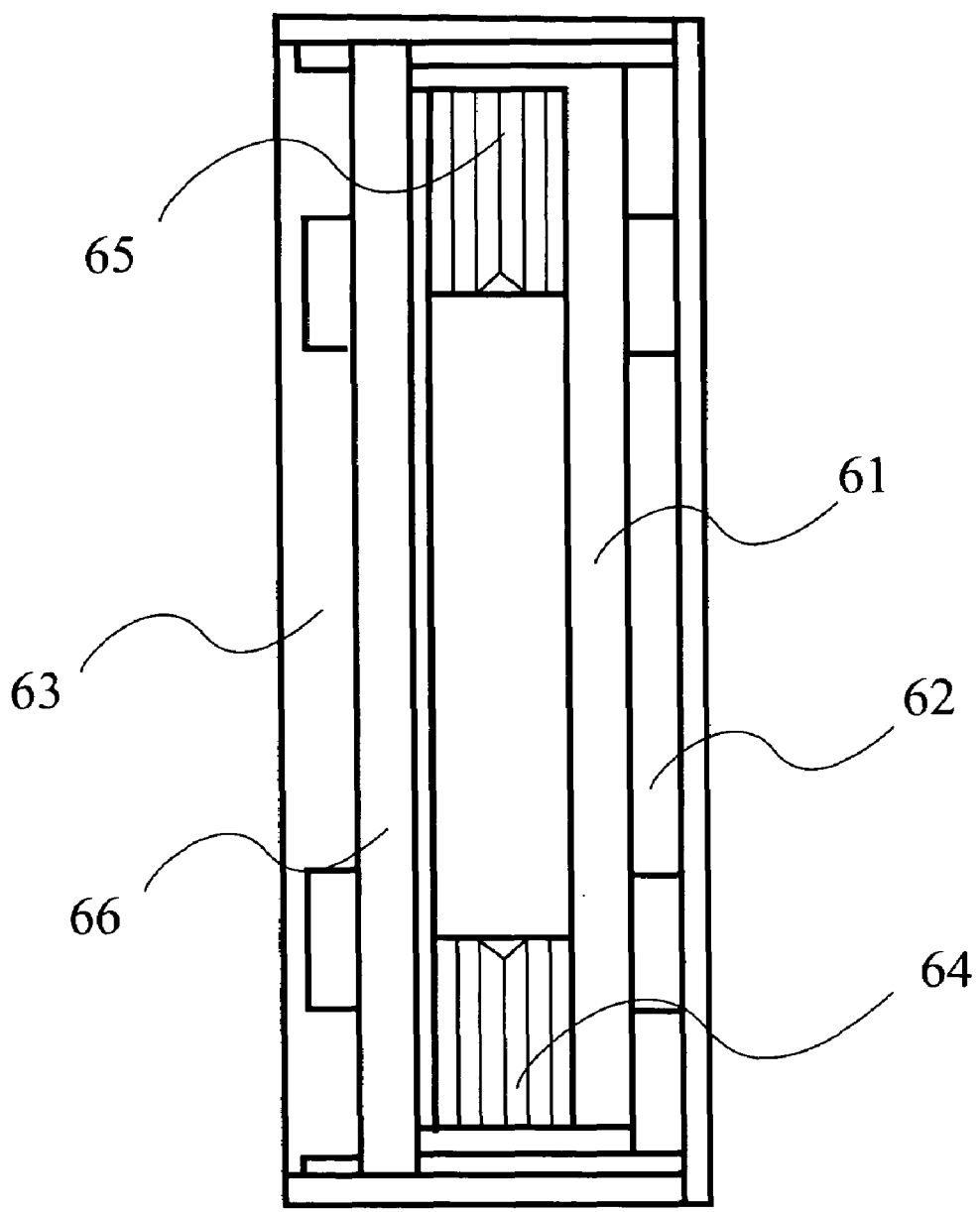
FIG. 7 shows a top view of collapsible and reusable container collapsed and in fully folded closed position.
Figure 17:
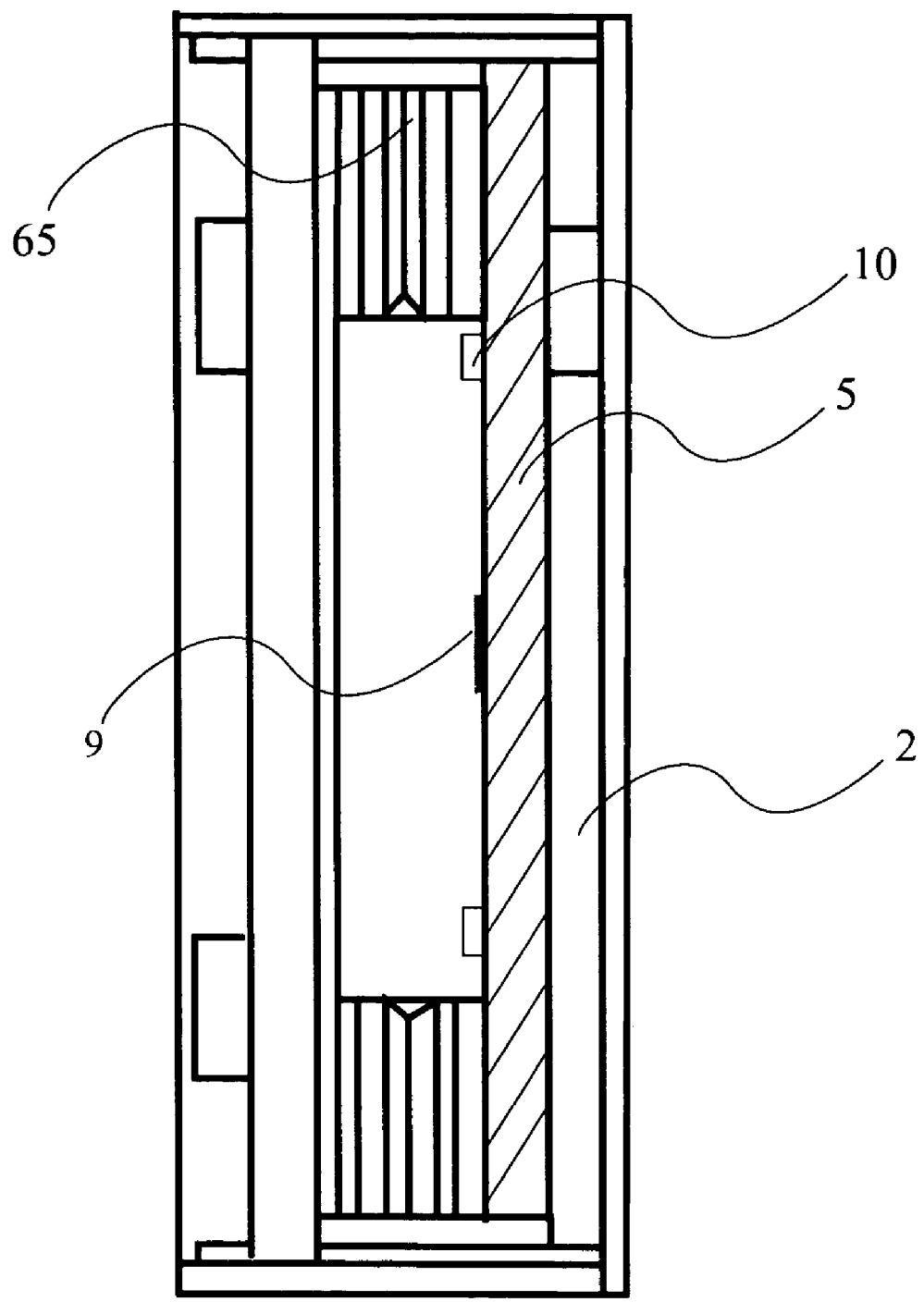
FIG. 17 shows the top view of the collapsible and reusable container in fully folded position as illustrated with top lid (5) inserted into holding slot atop of resting ledge (61) into a fully transportable and self contained unit.

FIG. 7 shows a top view of collapsible and reusable container collapsed and in fully folded closed position with a top view of bottom panel resting ledge to accommodate top lid insertion as shown in FIG. 17.

Figure 8:
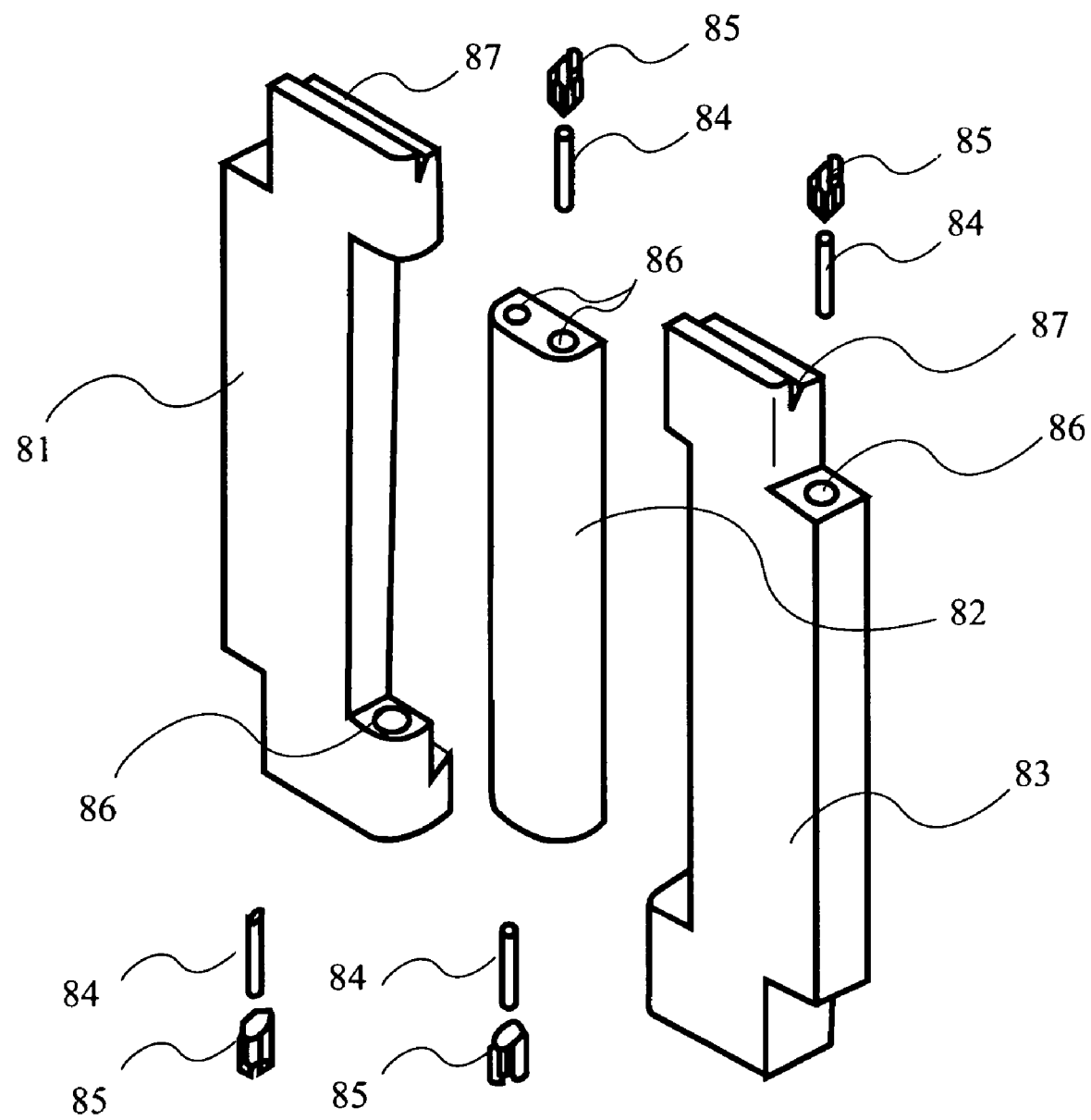
FIG. 8 shows an exploded view of a side panel detailing hinged mechanism as seen from outside of the collapsible and reusable container.

FIG. 8 shows an exploded view of a side panel detailing hinged mechanism as seen from outside of the collapsible and reusable container detailing left side hinge assembly (81), center hinge assembly (82), right side hinge assembly (83), adjoined by pins (84) inserted and rotable by sleeve means (85) whereby sleeves are inserted into slots (86). Left side hinge assembly (81) and right side hinge assembly (83) can be made with varying widths, whereby entire side portion of either left side (2) and right side (3) can be extended depending on intended use of particular collapsible and reusable container. Resting ledge (87) of left side hinge assembly (81) and of right side hinge assembly (83) serve as foundations for top lid (5) whereby sturdiness is added for security and strength of collapsible and reusable container.

Figure 9:
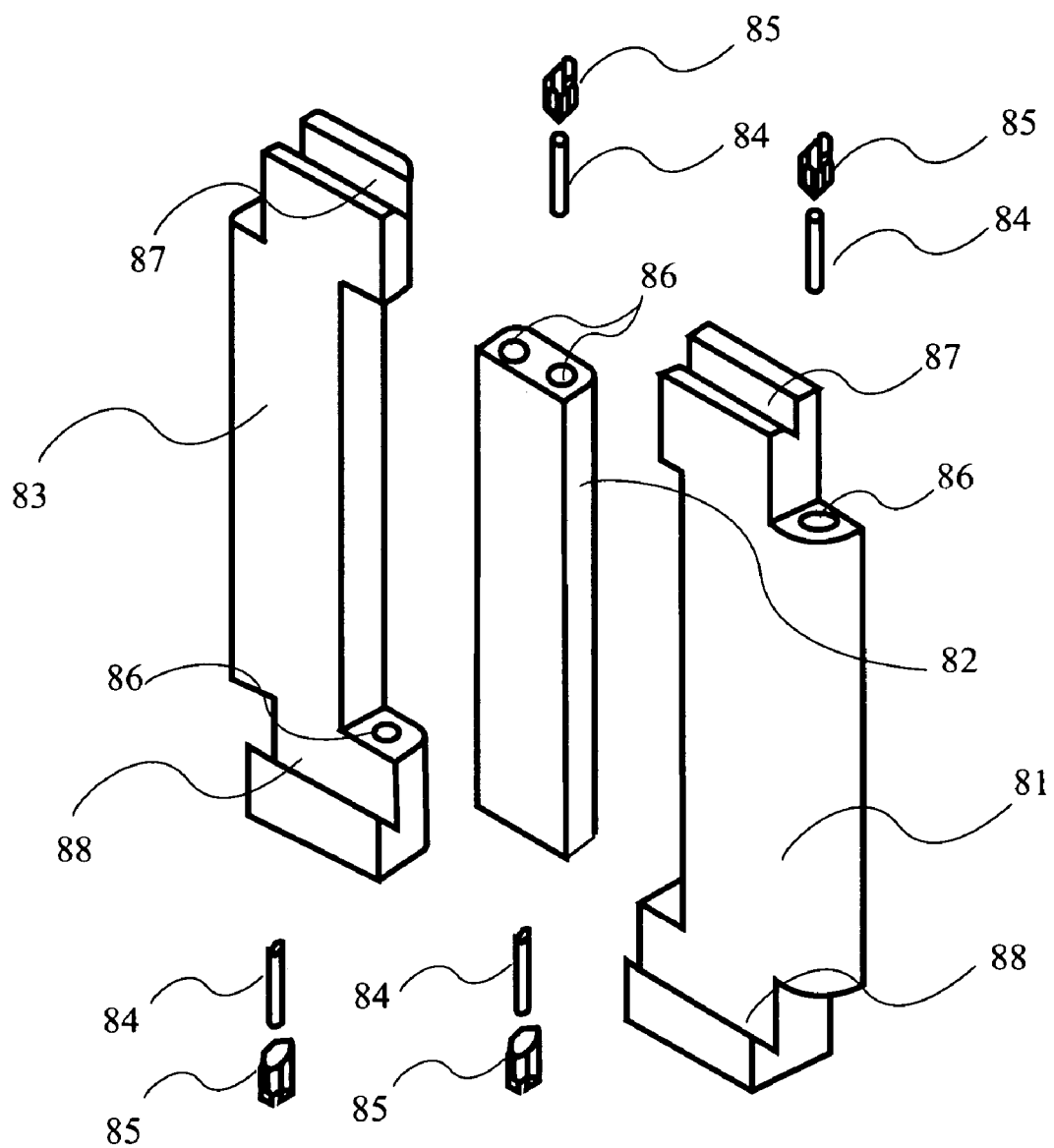
FIG. 9 shows an exploded view of a side panel detailing hinged mechanism as seen from inside of the collapsible and reusable container.

FIG. 9 shows an exploded view of a side panel detailing hinged mechanism as seen from inside of the collapsible and reusable container detailing left side hinge assembly (81) as seen from inside of container, center hinge assembly (82) as seen from inside of container, right side hinge assembly (83) as seen from inside of container, adjoined by pins (84) inserted and rotable by sleeve means (85) whereby sleeves are inserted into slots (86). Left side hinge assembly (81) and right side hinge assembly (83) can be made with varying widths, whereby entire side portion of either left side (2) and right side (3) can be extended depending on intended use of particular collapsible and reusable container. Resting ledge (87) of left side hinge assembly (81) and of right side hinge assembly (83) serve as foundations for top lid (5) whereby sturdiness is added for security and strength of collapsible and reusable container. Bottom ledge (88) on bottom portions of left side hinge assembly (81) and right side hinge assembly (83) serves as foundation for bottom panel (11) when bottom panel is swung downwards whereby added sturdiness, security and strength is added to the invented collapsible and reusable container.

Figure 10:
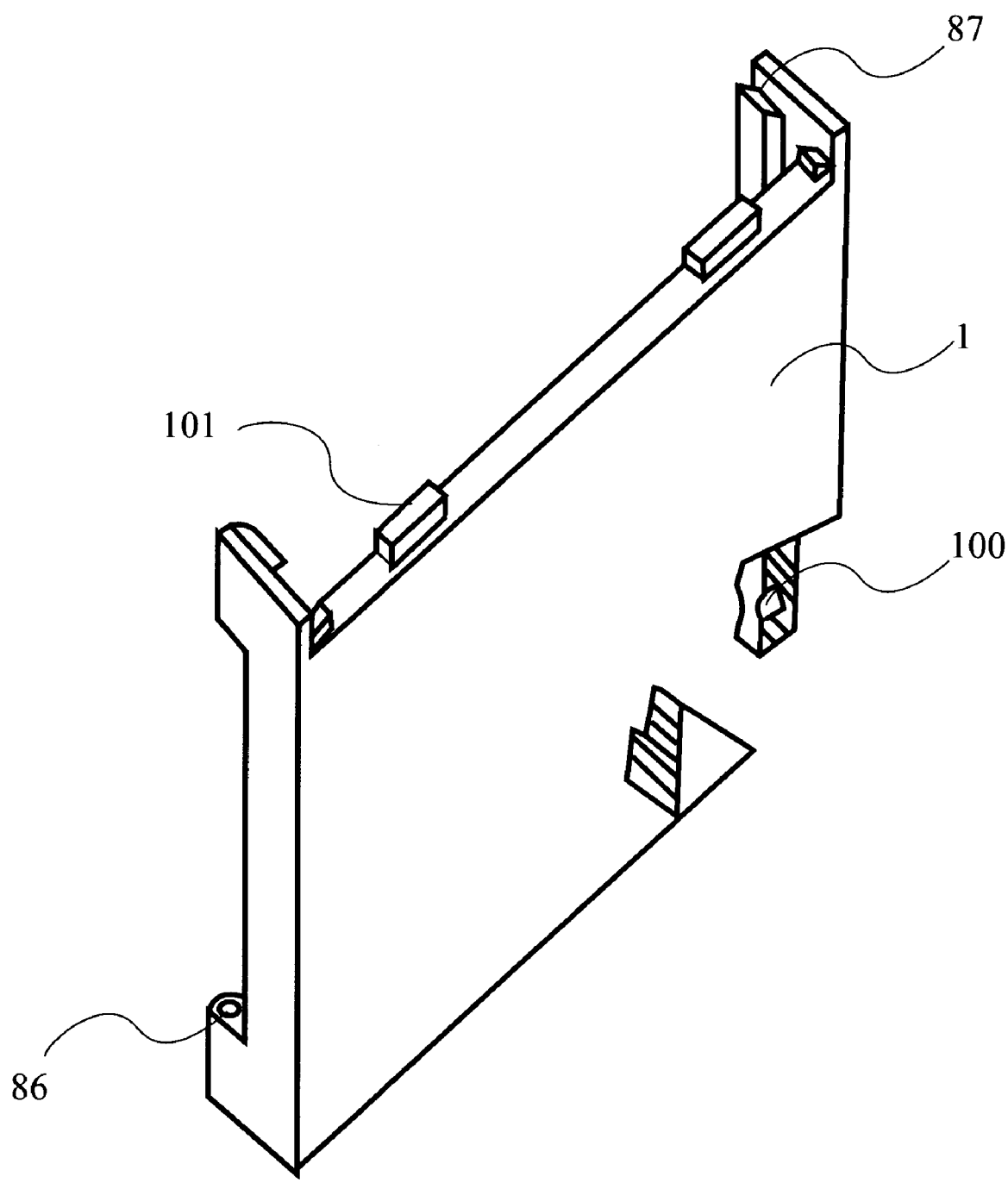
FIG. 10 shows front panel of the outside of the collapsible and reusable container and a cut-away view enabling view of hole for hinge insert whereby bottom panel hinges and swings upward or downward.

FIG. 10 shows front panel (1) of the outside of the collapsible and reusable container and a cut-away view enabling view of hole for hinge insert (100) means whereby bottom panel hinges and swings upward or downward. Suspended view of front panel (1) allows for front panel aligning groove (101) to be visible, also is slot (86) on front panel and resting ledge (87) for top lid (5).

Figure 11:
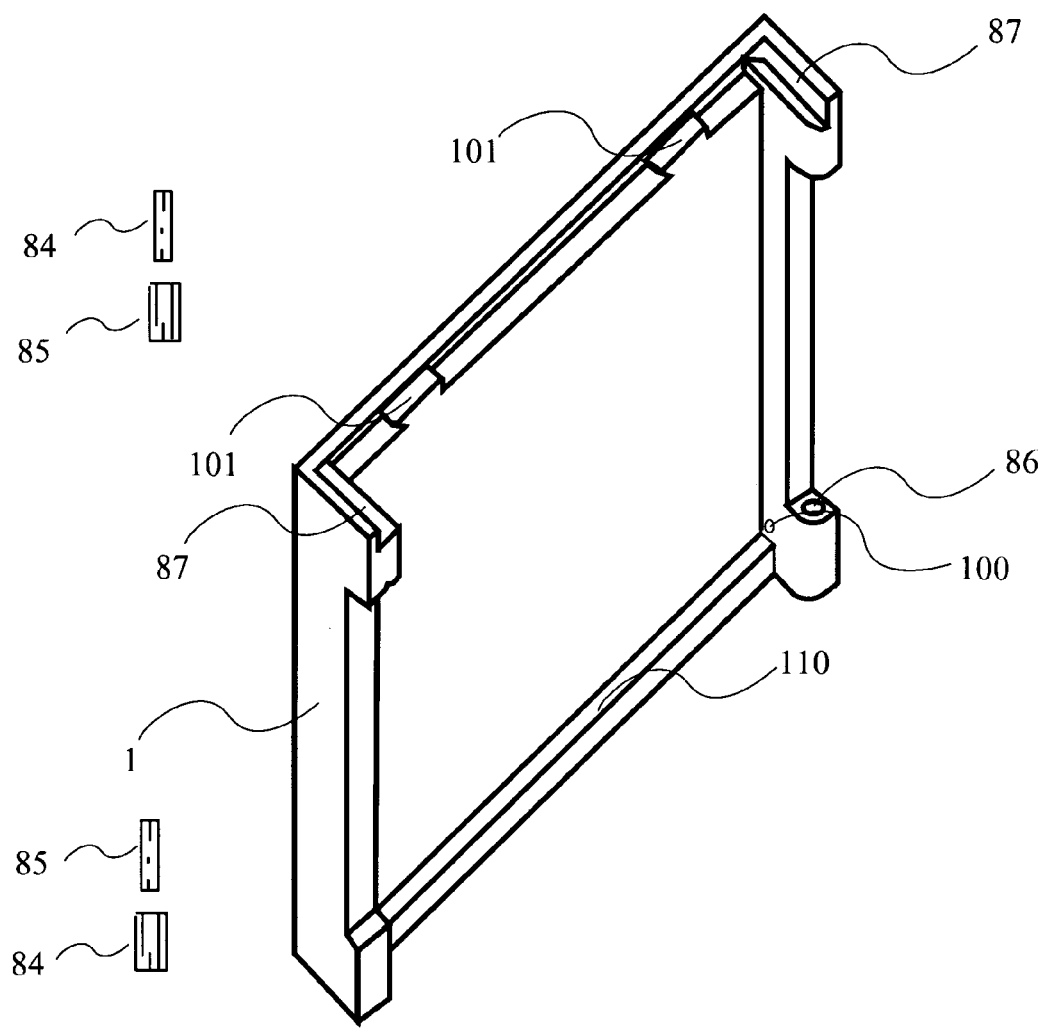
FIG. 11 shows front panel of the inside of the collapsible and reusable container exhibiting slot hole for hinge insert whereby bottom panel hinges and swings upward or downward.

FIG. 11 shows front panel (1) with an inside view of the collapsible and reusable container exhibiting slot hole for hinge insert (100) whereby bottom panel hinges and swings upward or downward and resting ledge on inside of front panel (110) whereby bottom panel rests for added sturdiness, security and strength is added to the invented collapsible and reusable container. Front panel aligning grooves (101) are visible, as are also insertion slot (86), hinge insert (100) and resting ledge (87) for top lid (5).

Figure 12:
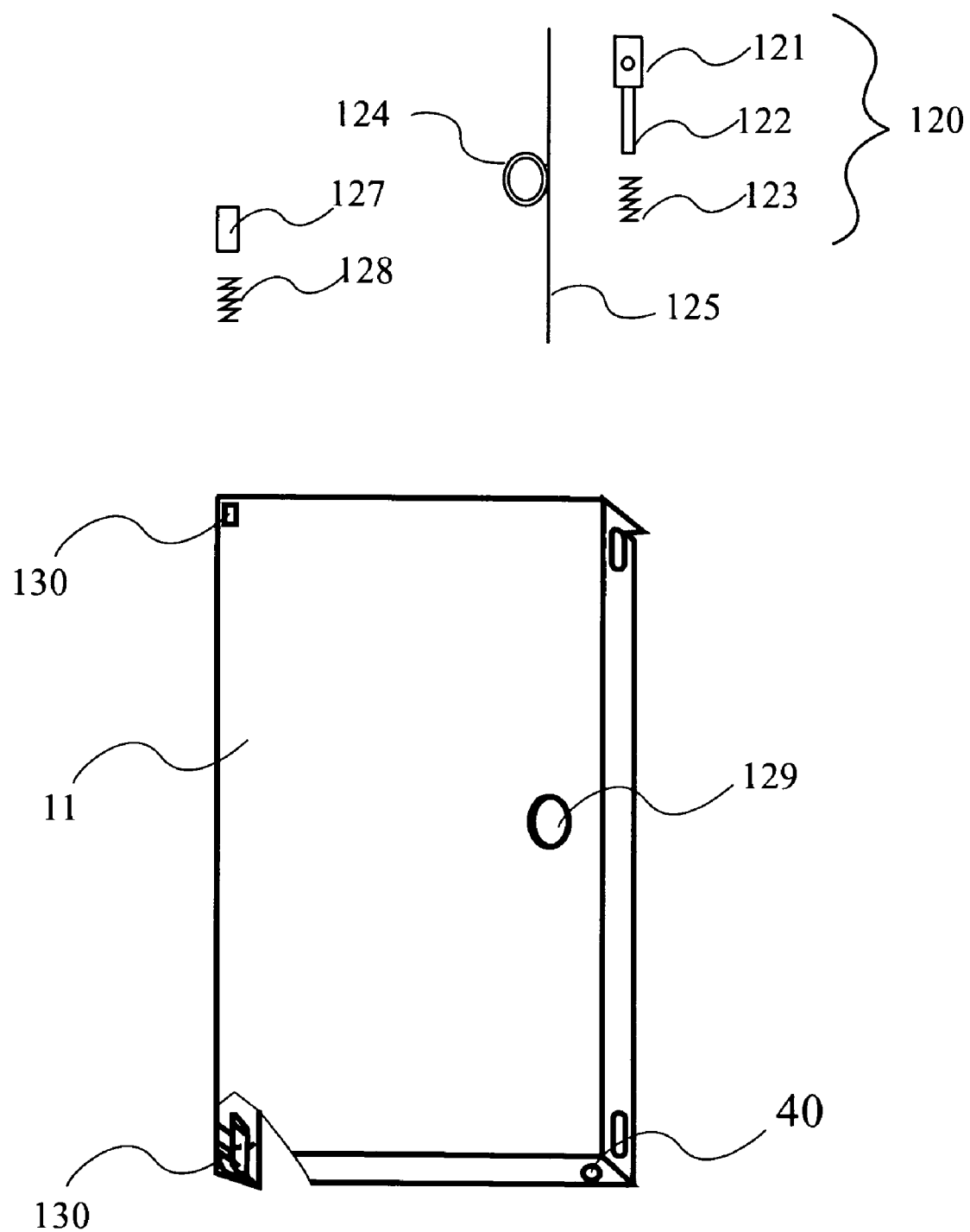
FIG. 12 shows the bottom panel of the collapsible and reusable container suspended, and with an exploded view of spring-locking mechanism whereby bottom panel is locked into fully open or fully collapsible position.

FIG. 12 shows the bottom panel (11) of the collapsible and reusable container suspended, and with an exploded view of spring-locking mechanism (120) in exploded view exhibiting lock piston (121), retracting rod (122) and return spring (123) whereby lock piston is normally extended outward into locking position until one pulls handle (124) through access hole (129) thereby forcing retracting rod (122) by connection means (125) toward center of panel (11) against return spring tension whereby bottom panel can be locked into fully open or fully collapsed position by means of piston insertion means (150). Hinge pin (127) inserts into sleeve (128) and are inserted into bottom panel hinge insert (130) whereby hinge pin (127) rotates within hinge insert (100).

Figure 13:
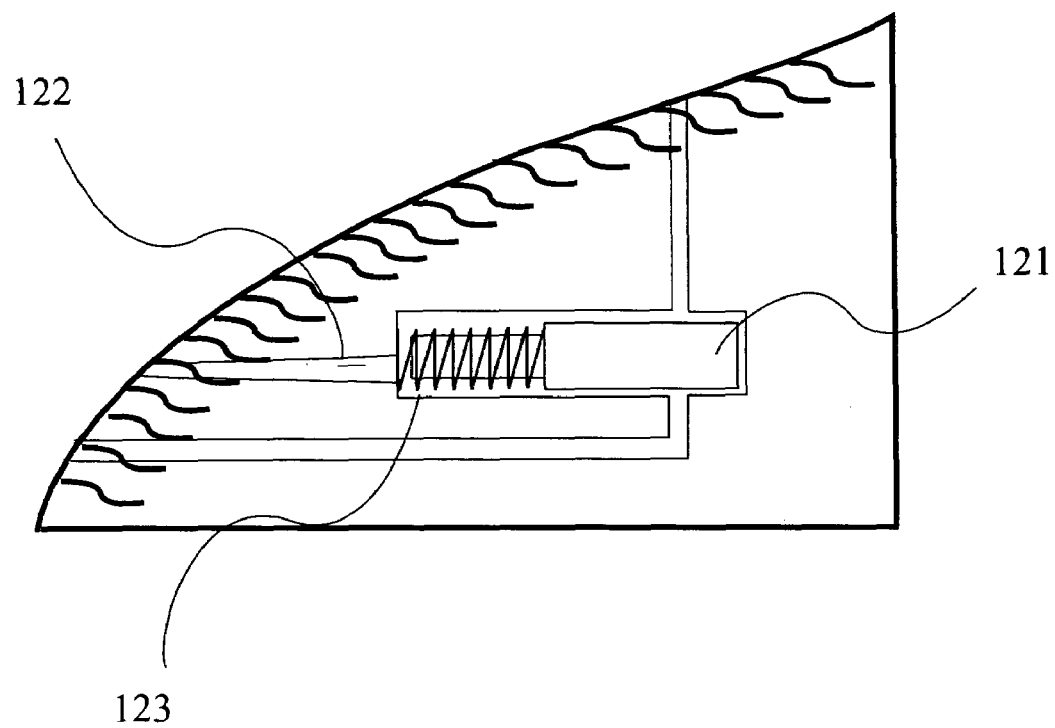
FIG. 13 shows a cut-away view of bottom panel detailing spring-locking mechanism in normally locked position with spring in normal position.

FIG. 13 shows a cut-away view of bottom panel detailing spring-locking mechanism in normally locked position with spring in normal position.

Figure 14:
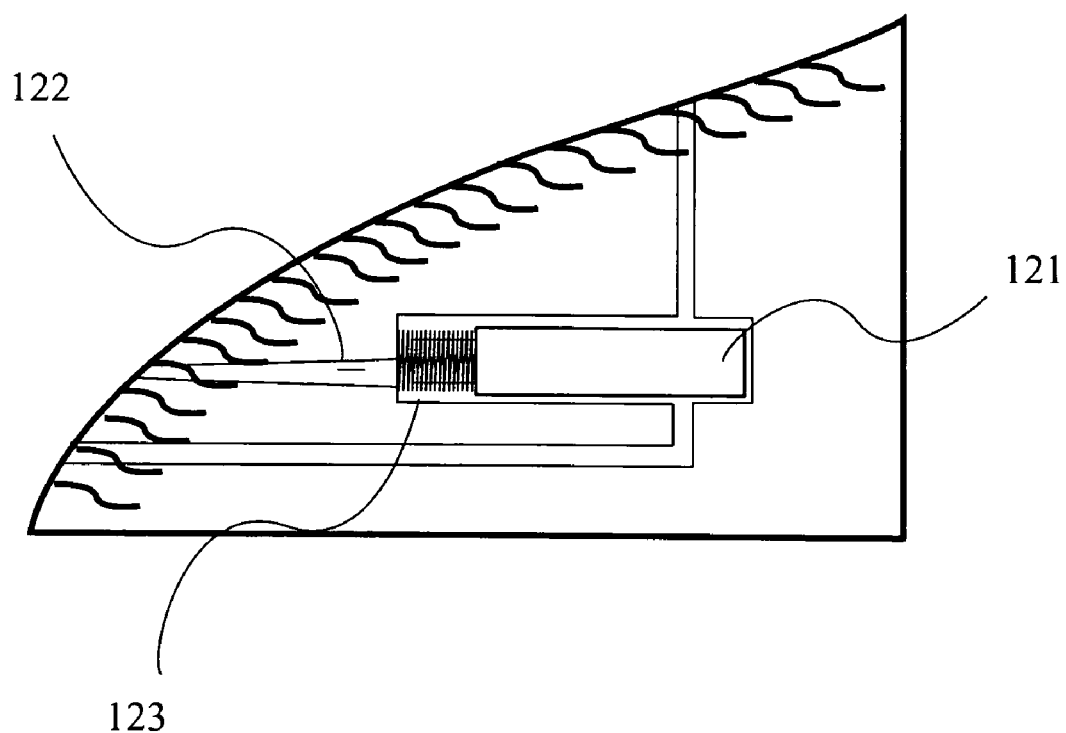
FIG. 14 shows a cut-away view of bottom panel detailing spring-locking mechanism in released position with spring in compressed position. (mechanism released by pulling on release hook)

FIG. 14 shows a cut-away view of bottom panel detailing spring-locking mechanism in release position with spring in compressed state as occurs when one pulls handle (124) thereby pulling retracting rod (122) and piston into an unlocked position and allowing for bottom panel (11) to be swung upwards for collapsing container.

Figure 15:
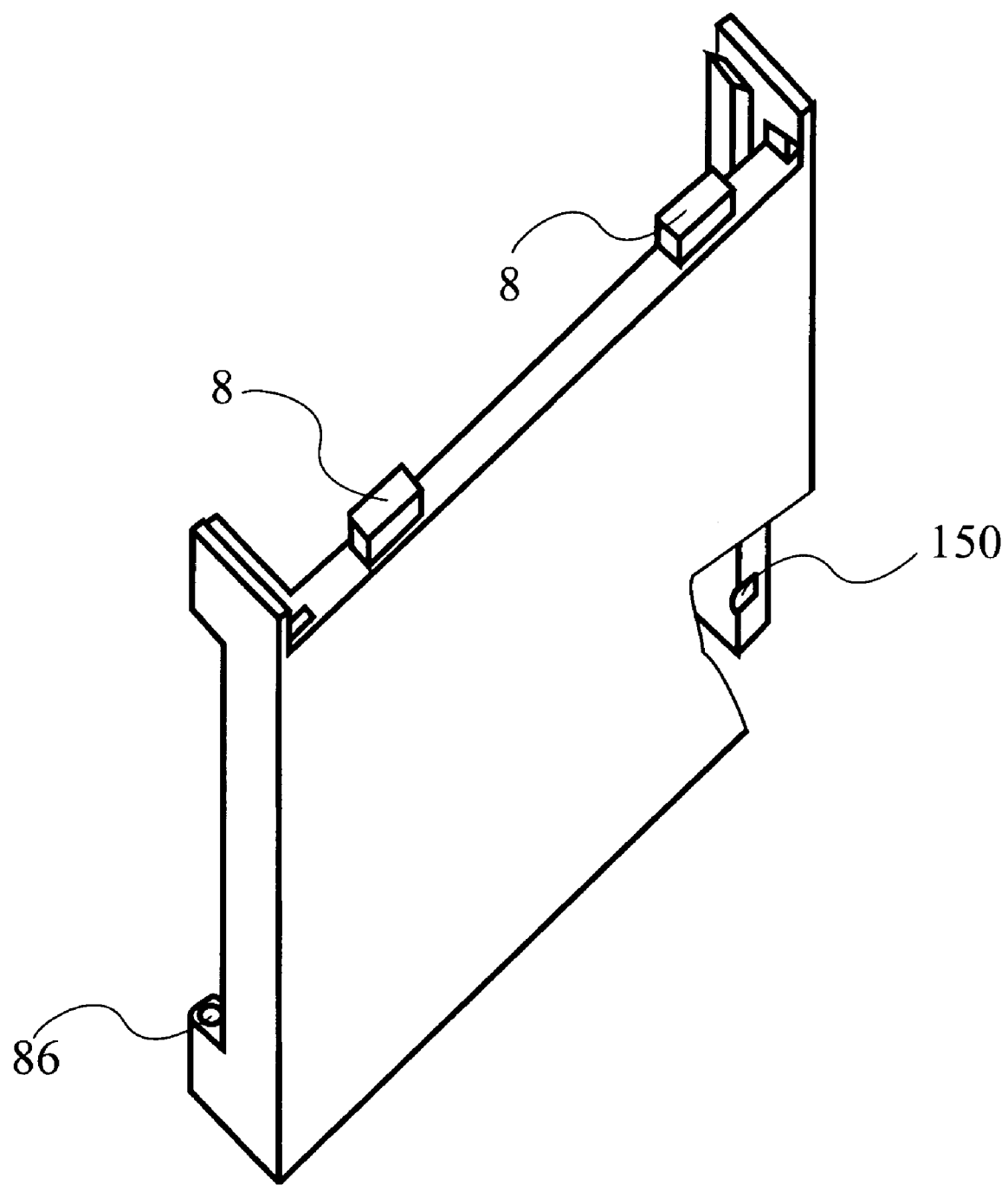
FIG. 15 shows the back panel as seen from the outside of the collapsible and reusable container and a cut-away view enabling view of hole for insert whereby bottom panel hinges and swings upward or downward and locking pin inserts thereby locking bottom panel in either fully open or fully collapsed position.

FIG. 15 shows the back panel as seen from the outside of the collapsible and reusable container and a cut-away view enabling view of hole for insert (150) whereby bottom panel hinges and swings upward or downward and locking pin inserts thereby locking bottom panel in either fully open or fully collapsed position.

Figure 16:
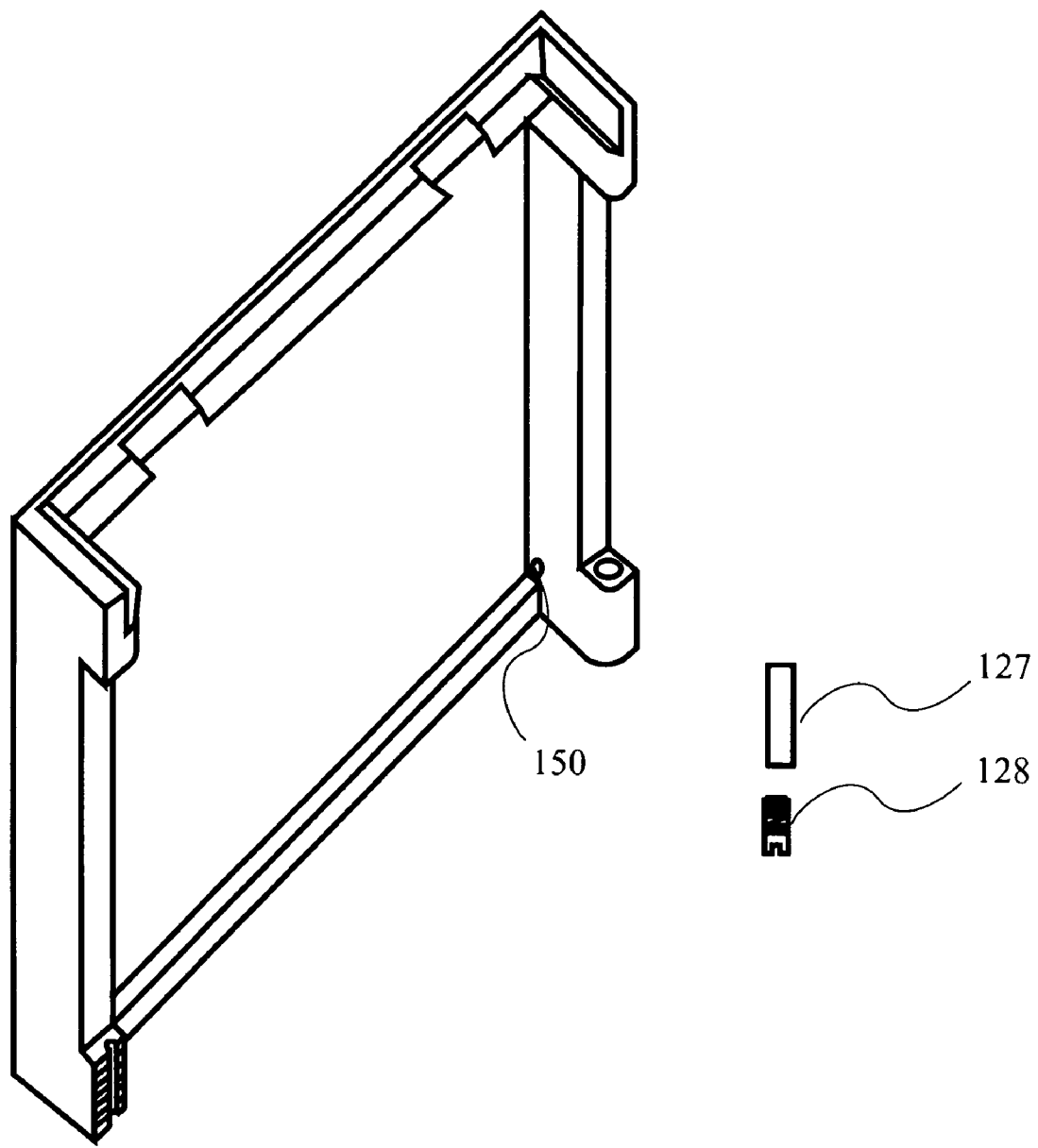
FIG. 16 shows the back panel as seen from the inside of the collapsible and reusable container exhibiting hold for insert whereby bottom panel hinges and swings upward or downward and locking pin inserts thereby locking bottom panel in either fully open or fully collapsed position.

FIG. 16 shows the back panel as seen from the inside of the collapsible and reusable container exhibiting hold for insert (150) whereby bottom panel hinges and swings upward or downward and locking pin inserts thereby locking bottom panel in either fully open or fully collapsed position.

FIG. 17 shows the top view of the collapsible and reusable container in fully folded position as illustrated with top lid (5) inserted into holding slot atop of resting ledge (61) into a fully transportable and self contained unit.

In comparison to the existing technologies, the uniqueness of this invention is set forth as the following: The present invention is a collapsible and reusable container that can be reused repeatedly and can be made from a variety of different materials. After the products or raw materials are shipped to their destinations in the collapsible and reusable container of the present invention, the collapsible and reusable container can be collapsed down to a flat, compact package occupying minimal volume with no small or loose parts that can be lost during shipping. This collapsed flat package can be easily stacked and shipped back to its original location occupying minimum space on the shipping vehicles when collapsed. This results in extra space that is conserved and can be used for more productive purposes, such as to ship other products either back to their original location or to new locations.

The collapsible and reusable container of the present invention is extremely easy to assemble and collapse without the need for tools or special skills or instructions. The collapsible and reusable container of the present invention can be securely locked with a single lock whereby the bottom and top sides can be locked into place thereby locking all sides into place.

The collapsible and reusable container of the present invention may provide an airtight means in which articles such as documents would be protected from environmental elements or alternatively, a means in which the contents would be open to external conditions, in instances of transport of produce. The present invention has the advantages over the prior art by having interchangeable parts. These interchangeable parts can be replaced as the parts and hinges of the container wear and necessitate replacement without having the expense of replacing the entire container. Such interchangeable parts of the present invention include the element of hinges and keys acting as pins for which the sides of the invention are rotatably connected. Such hinges fit together by means of pins or keys having a male insertion end fitting into a female receiving end. These pins are removable by means of a locking mechanism or threadlike means.

The present invention is composed of material for purposes of use depending on such uses. Such common uses that are a means of example and not limitation are for common transportation in which documents may be transported from one location to another and in which plastic or a resin of which would be satisfactory material. Another use of the present invention would be the transportation of monies or currencies or other important items in which the connecting keys or pins would be hidden and unexposed whereby forcible entry of the container's contents would be prevented. An additional element capable of providing added protection of the container's contents including such important items would be added weight in the form of the material composing the container itself so that easy asportation would not be achieved by improper parties. The addition of a locking means would provide additional security. In instances in which the containers of the present invention wound into improper possession the additional element of a tracking means such as global positional system or GPS would provide for recovery. Such security would provide for, as a way of example and not limitation, the public, public and private businesses, military, etc.

Such locking means would provide locking for the bottom and the top side, whereby all sides would be locked in place and prevented from collapsing. The locking means would eliminate the necessity for tapes or other adhesives thereby preventing further additional waste products. Such locking means could be by way of example and not limitation, a combination in which the end receiver would have access by a combination or a key in which parties of a same company would be able to unlock such locking means.

The bottom portion of the present invention would provide a non-slip means such that it may also serve as a stackable means fitting into companion stackable means on the tops of other similar containers.

The top lid of the present invention is removable and may be hinged outward or removed by lifting diagonally from the top clearing the locking portions that prevent the lid from coming off accidentally. The removed lid may be placed into an accompanying slot between the folded sides of the container and held into place by a locking means. Such locking means, by way of example and not limitation can be a belt that holds the container in its folded position with said lid covering inside each container's designated slot and preventing said lid from loss. Such locking means can also serve as a means to keep said lid on present container in fully open position. Depending on required use, such locking means can be made of different materials for added security as necessary.

The present invention may utilize a grooved side that acts as a carrying handle. The sides of the present invention can be elongated as pieced (3) or (5) can be extended to a length limited by the length of the front and back sides to allow for expansion of the container while retaining compact folded size.

The bottom stacking means of a container stacked on top in relation to the bottom relative container does not rest on the bottom of said top container. Such support is composed of each container's sides acting as supports so as to enable equal weight distribution to be spread throughout the container's sides instead of having support weight on said top container's bottom.

Such containers of the present invention could be used for all types of packaging, small or large. Such containers if made large enough would provide added sturdiness and protection for such articles as televisions or refrigerators and could be returned for a refund.

The present invention may have a covering or pocket means on an outside panel to enable a packing list, or receipt detailing the contents of the container. Presently, the packing list enclosed portion on shipping boxes must be ripped apart and in which time boxes tear resulting in weakening of boxes. By having a permanent pocket on the outside, such materials are saved from having to be remanufactured as the pocket can be reused as the packing list can simply be removed and reinserted with a new packing list.

At the end of the container of the present invention's shipping use, the container can be used for potting, by placing soil into such containers and planting trees, and serve as a means for growing such plants that can be sold to the public. Such additional planting conduits for plants would contribute in the aggregate, to the lessening of overall effect of global warming.

Another example of a possible use of the container of the present invention and not a limitation, after its shipping life ends, is to use the container as a means to serve as a dam or as a water barrier. Containers of the present invention would be filled with rocks or other materials providing weight to prevent flooding of waters after rains and would be more efficient than ordinary sandbags as sandbags are mostly only filled with sand, but the containers of the present invention may be filled with rocks or any other material.

At the end of the container's use as a potting pot or dam, the containers depending on their composition can be burned or incinerated or can be treated with bacteria which would digest such materials.

Still other objects, features, and attendant advantages of the present invention will become apparent to those skilled in the art from a reading of the following detailed description of embodiments constructed in accordance therewith, taken in conjunction with the accompanying drawings.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

We claim:

1. A collapsible and reusable container comprising:
    a four-sided first panel with a width and a length,
    a four-sided second panel with a width and a length,
    a four-sided third panel with a width and a length,
    collapsible side walls which are constituted by short side walls, whereby the side walls are movably attached to the second panel and the third panel on either side of the container by a bracket,
    a forth panel removably attached to top of said container opposite of said first panel whereby said forth panel is positioned into place by sliding means on top of second panel, third panel and collapsible side walls to close the container wherein male grooves on second and third panel align with corresponding female grooves on forth panel whereby forth panel is securely fastened as a lid surface,
    wherein an aligning, stacking, locking means is coupled to outside surface of forth panel, wherein said collapsible and reusable container collapses having means of self containing removably detached forth panel within said container and secured into a self contained unit by said locking means,
    wherein said first panel is rotably connected to said second panel,
    wherein said second and third panel have foundational means for said first panel to rest into position as a bottom panel and releasable locking means whereby first panel locks into position to serve as bottom panel,
    wherein said collapsible side walls supply a carrying means for transportation of enclosed contents within container,
    wherein said second panel's exterior has an identification means,
    whereby a sturdy apparatus for transportation or storage will be provided.

2. The collapsible and reusable container according to claim 1,
    wherein side walls are movably connected by hinge means having 4 hinge assemblies thereby coupling said side walls and bracket together.

3. The collapsible and reusable container according to claim 2,
    wherein hinge means comprise of pins and sleeves, said pins are removable and secured into place and hidden from view by said lid surface whereby said sleeves forming said hinge means is of a beveled shaped allowing for collapsing said side walls closed, and said bevels of said hinge means for preventing said side walls from expanding past fully erect open position.

4. The collapsible and reusable container according to claim 1,
    wherein said sliding means is a ledge whereby said lid uses as a resting surface.

5. The collapsible and reusable container according to claim 1,
    wherein said aligning means is a pre-formed male and female coupling whereby said lid is secured firmly in place.

6. The collapsible and reusable container according to claim 1,
    wherein said stacking means is a spacer forming a male end on top of said container lid surface for placement under female bottom of a second said container.

7. The collapsible and reusable container according to claim 1,
    wherein said locking means is a "Velcro" or similar strap.

8. The collapsible and reusable container according to claim 1,
    wherein said carrying means is an incised oval whereby picking up or placing down of said container is achieved without the need for reaching underneath said container.

9. The collapsible and reusable container according to claim 1,
    wherein said releasable locking means of said first panel is comprised of a piston, retracting rod and spring whereby said piston expands and locks said first panel securely into position.

10. The collapsible and reusable container according to claim 1,
    wherein said carrying means is a handle or strap.

11. The collapsible and reusable container according to claim 1,
    wherein said second panel's exterior surface identification means is a transparent pocket whereby labeling containing a bar code, description of contents or identification may be provided.

12. A collapsible and reusable container according to claim 1,
    wherein the container is manufactured through a process of injection molding, vacuum molding, blow molding or press molding of one or more polymeric materials such as polyethylene, polypropylene, polybutene, polyvinylchloride, polyalkylene-therephtalate, acrylonitrile-butadiene-styrene copolymer, polyamide, polycarbonate or the like.

13. A collapsible and reusable container according to claim 1,
   wherein said aligning, stacking, locking means is of such depth whereby, weight of a top container's contents rest on sides of said top container and thereby minimizing force on said top container's bottom panel and thereby distributing weight evenly whereby said stacking means is a spacer forming a male end on top of said container lid surface for placement under female bottom of a second said container.

14. A collapsible and reusable container according to claim 1,
   wherein said aligning, stacking, locking means has a non-slip means on bottom composed of rubber.

15. A collapsible and reusable container according to claim 1,
   wherein said collapsible side walls vary in lengths for expansion of container size as needs require whereby said bracket is re-used.

* * * * *